US011777367B2

(12) United States Patent
Foucaut et al.

(10) Patent No.: US 11,777,367 B2
(45) Date of Patent: Oct. 3, 2023

(54) LINEAR COMPACT ELECTRIC ACTUATOR HAVING A RESILIENT KINEMATIC CHAIN (71) Applicant: MMT AG, Zug (CH)

(72) Inventors: Antoine Foucaut, Montarlot lès Rioz (FR); Benjamin Thierry, Maiche (FR)

(73) Assignee: MMT AG, Zug (CH)

( * ) Notice: Subject to any disclaimer, the term of this patent is extended or adjusted under 35 U.S.C. 154(b) by 0 days.

(21) Appl. No.: 17/041,056

(22) PCT Filed: Apr. 12, 2019

(86) PCT No.: PCT/EP2019/059558
§ 371 (c)(1),
(2) Date: Sep. 24, 2020

(87) PCT Pub. No.: WO2019/197668
PCT Pub. Date: Oct. 17, 2019

(65) Prior Publication Data
US 2021/0143706 A1 May 13, 2021

(30) Foreign Application Priority Data

Apr. 13, 2018 (FR) ...................................... 1853245

(51) Int. Cl.
H02K 7/11 (2006.01)
H02K 7/116 (2006.01)
(Continued)

(52) U.S. Cl.
CPC ............ *H02K 7/1166* (2013.01); *H02K 7/06* (2013.01); *H02K 7/081* (2013.01); *H02K 11/215* (2016.01); *H02K 11/38* (2016.01); *H02K 2211/03* (2013.01)

(58) Field of Classification Search
CPC ........ H02K 7/06; H02K 7/081; H02K 7/1166; H02K 11/215; H02K 11/38; H02K 2211/03
(Continued)

(56) References Cited

U.S. PATENT DOCUMENTS 5,865,272 A * 2/1999 Wiggins ................ F16K 31/047
74/89.31
6,184,604 B1 2/2001 Takano et al.
(Continued)

FOREIGN PATENT DOCUMENTS

FR 3056841 A1 3/2018
WO WO 2014/173667 4/2014
WO WO 2017/068285 10/2017

*Primary Examiner* — Rashad H Johnson
(74) *Attorney, Agent, or Firm* — Harness, Dickey & Pierce PLC (57) ABSTRACT An electric actuator includes a casing having a base, on which an electric motor is fixed having a stator with radially extending straight teeth and having a plurality of coils and a rotor formed by a plurality of magnets. The coils extend in a plane parallel to the base of the casing and the rotor is extended by a pinion forming a worm gear with an axis perpendicular to the orientation of the coils. The worm gear meshes with a threaded rod extending parallel to the base of the casing, wherein the threaded rod is guided at the rear by a fixed smooth bearing or by a fixed nut, with the smooth bearing or nut being rigidly connected to a cover of the casing. The axial end of the worm gear is guided by the cover and a printed circuit, to which the plurality of coils is connected, is positioned between the stator and the threaded rod.

15 Claims, 6 Drawing Sheets (51) Int. Cl.
  *H02K 11/215* (2016.01)
  *H02K 11/38* (2016.01)
  *H02K 7/06* (2006.01)
  *H02K 7/08* (2006.01)

(58) Field of Classification Search
  USPC .................................................. 310/75 R, 80
  See application file for complete search history.

(56) References Cited

U.S. PATENT DOCUMENTS

| | | | |
|---|---|---|---|
| 6,249,100 B1 | 6/2001 | Lange | |
| 7,471,020 B2* | 12/2008 | Abrahamsen | F16H 25/20 |
| 10,112,456 B2* | 10/2018 | Kalore | B60H 1/00857 |
| 10,502,293 B2 | 12/2019 | Foucaut et al. | |
| 10,594,173 B2 | 3/2020 | Andruiex et al. | |
| 10,643,773 B2 | 5/2020 | Loussert et al. | |
| 2004/0093969 A1 | 5/2004 | Nielsen | |
| 2006/0243078 A1* | 11/2006 | Sesita | F16C 25/08 |
| | | | 74/425 |
| 2006/0245098 A1* | 11/2006 | Suzuki | F01L 13/0015 |
| | | | 360/1 |
| 2007/0169578 A1* | 7/2007 | Christensen | F16H 25/2021 |
| | | | 74/625 |
| 2007/0295125 A1* | 12/2007 | Marthaler | F16H 19/04 |
| | | | 74/89.29 |
| 2008/0156132 A1* | 7/2008 | Pachov | F16H 1/16 |
| | | | 74/425 |
| 2008/0216781 A1* | 9/2008 | Furuta | H02K 1/2733 |
| | | | 464/29 |
| 2009/0091287 A1 | 4/2009 | Bastholm | |
| 2009/0256440 A1* | 10/2009 | Kragh | H02K 11/21 |
| | | | 310/83 |
| 2010/0012062 A1* | 1/2010 | Nakamura | F01L 1/352 |
| | | | 123/90.18 |
| 2012/0229005 A1 | 9/2012 | Tominaga et al. | |
| 2012/0240707 A1* | 9/2012 | Pachov | B66D 5/30 |
| | | | 74/425 |
| 2013/0300222 A1* | 11/2013 | Nakano | H02K 3/50 |
| | | | 310/43 |
| 2016/0084360 A1* | 3/2016 | Foucaut | F16H 25/20 |
| | | | 74/89.23 |
| 2016/0146366 A1* | 5/2016 | Takahashi | F16K 11/00 |
| | | | 251/129.15 |
| 2016/0312867 A1* | 10/2016 | Larson | F16H 25/205 |
| 2017/0282687 A1 | 10/2017 | Kalore et al. | |
| 2019/0047611 A1* | 2/2019 | Murakami | H02K 11/33 |
| 2019/0063527 A1* | 2/2019 | Thomas | F16D 55/226 |
| 2019/0217882 A1* | 7/2019 | Figura | B62D 5/0463 |
| 2020/0087129 A1* | 3/2020 | Caffa | B67B 3/2066 |
| 2020/0340501 A1* | 10/2020 | Niklaus | F15B 13/0444 |
| 2021/0009190 A1* | 1/2021 | Wang | B62D 7/1581 |

* cited by examiner

LINEAR COMPACT ELECTRIC ACTUATOR HAVING A RESILIENT KINEMATIC CHAIN

CROSS-REFERENCE TO RELATED APPLICATIONS

This application is a National Phase Entry of International Patent Application No. PCT/EP2019/059558, filed on Apr. 12, 2019, which claims priority to French Patent Application No. 18/53245, filed on Apr. 13, 2018, both of which are incorporated by reference herein.

TECHNICAL FIELD

This invention relates to the field of linear actuators intended to drive a moving member such as, for example, the valve member of an EGR valve and more generally a member which must remain in a position against a load, consuming minimal or even no electrical energy. In particular, actuators intended to control the valve member of a valve of the exhaust gas recirculation circuit, known as an EGR cooler bypass valve, are controlled by a transmission rod transmitting a force from a gear motor to a member to be controlled.

BACKGROUND

Valves that have been installed for many years on motors with an exhaust gas recirculation are usually controlled by means of a pneumatic cylinder. This actuating device has the advantage of compactness and mass with a high level of force, but it requires an expensive pneumatic circuit and a permanently operating vacuum pump. When pneumatically operated, the closed position of the valve member is maintained without difficulty due to the permanent vacuum created by the vacuum pump. This vacuum pump will most likely be eliminated on future automobile platforms, and thus it is becoming important to find an alternative to this pneumatic cylinder, based on a purely electric actuation.

There are numerous electric actuators suitable to control fluid regulation valves and resistant to the harsh environments of the exhaust line, especially high temperatures. For example, document WO2014/173667 is known, which presents an electric actuator for linearly displacing a member by means of a worm gear that may be moved helically by means of a gear motor. The technical solution presented is interesting and relevant, but the document does not specify how the member is linked to the application or to the flap to be moved. It provides no incentive to limit the electric power consumption of the actuator when the valve member to be controlled is in the closed position.

Document WO2017/068285 is also known, which presents another type of solution for a linear actuator, here in the form of a direct drive actuator without motion conversion, which notably has one or two stable end-of-stroke positions. In addition, there are a multitude of similar linear actuation solutions for achieving stable positions based on electromechanical principles, e.g. piezoelectric, which are not detailed here.

None of the actuation solutions of the prior art are able to replace the current pneumatic solution, while maintaining its advantages of compactness, reduced mass, and a high blocking force with the ability to absorb substantial gas pulsations. These pulsations come from cylinders very close to said valve at high temperatures, up to 140°, and are transmitted by the control stem of the valve member of the valve.

Moreover, none of the solutions of the prior art provides for obtaining these blocking functions without inducing substantial electric power consumption. The solution presented in document WO2017/068285 is interesting for this purpose, but they are not very controllable because of highly nonlinear force laws and because they have a relatively low mass force density. In addition, it is difficult to permit the sealing of a valve member because it must be obtained by means of a residual magnetic gap in the actuator. In effect, in this case of use, it is thus necessary to overdimension the magnetic force so as to overcome the positioning tolerances of the actuator relative to the position of the valve member. This results in bulky and inefficient actuators.

The solutions of the prior art thus do not globally meet all the functionalities which are needed to obtain a high mass force density, a sealing of the valve member and a null or low power consumption compared to the consumption necessary to move the valve member. The technical problem associated with this motorized valve application for exhaust gas recirculation heat exchangers—a problem which is not however exclusive to this application—lies in the combination of several technical features, which are combined with the pneumatic actuator solution, but which are not satisfied by the electric actuator solutions of the state of the art.

In effect, the gas recirculation exchanger actuator should combine all of the following features:

Its mass must be reduced as much as possible so as not to cause damage to the heat exchanger on which it is fixed and to resist the strong vibrations of the motor.

Its outer dimensions must also be reduced because it must be able to replace the current pneumatic actuator in all the different motor installation configurations, including those which offer reduced available spaces. Ideally, the electric actuator should retain the outer dimensions of the pneumatic actuator currently used, which is particularly compact. This feature of compactness is the condition to ensure its use without the risk of having to modify the complex and expensive metal parts that make up the body of the heat exchanger on which said actuator is fixed.

Its current consumption should be low or even zero, at least in the stable positions of the valve, which correspond to either fully open or fully closed positions. This means that the actuator must have a high stiffness to keep the valve closed against pressure pulsations, without requiring a high current.

Its force density must be high in order to provide high-level force performance in a small space and with a low current.

The transmission kinematics of the valve actuator must be irreversible in order to filter out the gas pulsations that originate at the valve member of the valve and propagate through the transmission levers. This irreversibility protects the drive rotor from these repeated stresses to ensure the service life of the electric actuator.

A modular design must allow the easy addition of a position sensor or a sealing bellows without changing the shape of the product to adapt to the specific requirements of each manufacturer.

The state of the art has therefore created a need for electric actuators based on gear motors with high motion reduction factors, which offer the expected force density and irreversibility qualities.

SUMMARY

The solution according to the invention offers the following technical advantages in comparison with the solutions of the state of the art:

The structure of the electric drive motor is flat and the height of the lamination pack that forms the stator thereof is very small, on the order of 5 mm, leading to minimal volume and mass.

This flat magnetic structure allows the placement of an electronic control unit to form a compact assembly adapted to receive a position sensor.

The rotor drives a worm gear reducer, which has a high reduction ratio in a very small space. The parts are made of plastics material and have a very reduced mass and resilient properties.

The rotor is extended by a pinion forming a worm gear directly meshing with a threaded rod. "Directly meshing" here means meshing by direct mechanical contact without intermediary between the worm gear and the threaded rod.

Alternatively, the motion conversion uses a space parallel to that of the particular structure of the motor in order to optimize the overall compactness of the electric actuator.

The pitch of the helix of the threaded portions of the worm gear is chosen to be low, so as to ensure the irreversibility of the motion conversion and to filter out the gas pulsations to protect the gears of the reducer which are made of plastics material as well as the rotor guides, also made of plastics material.

In a secondary embodiment, the magnetic structure of the polyphase motor makes it possible to move all the coils to the same side of the rotor axle and to offset the rotor relative to the geometrical center of the actuator casing. In this way, the association with a worm gear reducer, which has an offset axis, allows the threaded shaft to be re-centered in the actuator casing and optimizes the outer dimensions of said actuator.

In a secondary embodiment, the control member of the linear actuator, movable in translation in the slidable engagement which connects it to the casing, is composed of a nut which cooperates with the threaded shaft and a spherical end-piece which allows a mechanical connection with a primary transmission lever. This primary transmission lever must pivot during motion to allow the rotation of the secondary lever linked to the valve member of the valve. The ball connection of the output member of the linear actuator with the primary lever is particularly suitable for transmitting motion by minimizing parasitic stresses and friction.

More specifically, the invention relates to an electric actuator comprising a casing having a bottom on which is fixed an electric motor having a stator with straight teeth extending radially and carrying a plurality of coils and a rotor formed of a plurality of magnets, said coils extending in a plane parallel to the bottom of said casing, said rotor being extended by a pinion forming a worm gear with an axis perpendicular to the orientation of said coils, said worm gear directly meshing with a threaded rod extending parallel to the bottom of said casing, characterized in that said threaded rod is guided at the rear by a fixed smooth bearing or by a fixed nut, in that said smooth bearing or nut is rigidly connected to a casing cover, in that the axial end of said worm gear is guided by said cover, and in that a printed circuit to which the plurality of coils is connected is positioned between said stator and said threaded rod. Preferably, the invention also relates to an electric actuator comprising a kinematic chain formed of at least the following elements: an electric motor driving a rotor carrying a worm gear, a threaded rod, a control member and a linking arm, said threaded rod being moved rotatably by means of said worm gear according to a worm gear-type conversion, said conversion being irreversible, said threaded rod driving said control member in a linear motion according to a conversion from a rotary to a linear motion, said control member driving a linking arm, said linking arm driving at one end a valve member, said valve member moving towards an end-of-stroke position in abutment on a seat, characterized in that any one or a plurality of elements forming said kinematic chain is made of a plastics material which is resiliently deformable in compression or bending; the stroke of said kinematic chain is greater than the stroke of said valve member so that the valve member applies a force on its seat in said end-of-stroke position, even in the absence of power to the electric motor. Preferably, but not restrictively, said linking arm or said control member is in the form of a ball joint in order to have at least one degree of freedom, respectively, relative to the control member or to the linking arm.

In a preferred embodiment, said threaded rod cooperates on the one hand with a fixed nut and on the other hand with a movable nut forming the control member and wherein said threaded rod is moved in a helical motion. Said fixed nut may be welded to the cover of the actuator. In an alternative embodiment, the control member is rigidly connected to a permanent magnet extending parallel to said threaded rod and a magnetosensitive probe, stationary relative to said permanent magnet, is positioned on a printed circuit in said actuator in order to determine the linear position of said control member. The permanent magnet may be encapsulated in plastics material and is guided in translation by a fixed bearing. Said bearing may be rigidly connected to said fixed nut. In a preferred embodiment, the movable nut is guided by the actuator casing.

The invention also relates to a method for controlling an electric actuator comprising a kinematic chain formed at least of the following elements: an electric motor driving a rotor carrying a worm gear, a threaded rod, a control member and a linking arm, said threaded rod being moved rotatably by means of said worm gear according to a worm gear-type conversion, said conversion being irreversible, said threaded rod driving said control member in a linear motion according to a conversion from a rotary to a linear motion, said control member driving a linking arm, said linking arm driving at one end a valve member, said valve member moving towards an end-of-stroke position in abutment on a seat; any one or a plurality of elements forming said kinematic chain is made of a plastics material which is resiliently deformable in compression or bending, the stroke of said kinematic chain is greater than the stroke of said valve member so that the valve member applies a force on said seat in said end-of-stroke position, even in the absence of power to the electric motor, said actuator being controlled according to a succession of electrical pulses, characterized in that a first succession of electrical pulses at a mid-level of 20 electrical current brings the valve member from a position called "open" to a position called "closed" wherein the valve member is in abutment on the seat at the end of stroke, a second succession of electrical pulses at a high level, higher than the mid-level of the first succession of electrical pulses, resiliently deforms the linking arm, the valve member applying a force to the abutment seat, a third succession of electrical pulses at a low level, lower than the mid-level of the first succession of electrical pulses, maintains the position of the valve member on the seat thereof.

The invention also relates to a method for controlling an electric actuator comprising a kinematic chain formed at least of the following elements: a rotor bearing a pinion, a threaded rod, a control member and a linking arm, said threaded rod being moved rotatably by means of said pinion driven by an electric motor according to a worm gear-type conversion, said conversion being irreversible, said threaded rod driving said control member in a linear motion according to a conversion from a rotary to a linear motion, said control member driving a linking arm, said linking arm driving a valve member at one end, said valve member moving towards an end-of-stroke position, abutting on a seat, any one or a plurality of elements forming said kinematic chain being resiliently deformable in compression or bending in the direction of motion of said linking arm, the stroke of said kinematic chain being greater than the stroke of said end of the linking arm, said actuator being driven according to a succession of electrical pulses characterized in that

- a first succession of electrical pulses at a mid-level of electrical current brings the valve member from a position called "open" to a position called "closed" wherein the valve member is in abutment at the end of stroke,
- a second succession of electrical pulses at a high level, higher than the mid-level of the first succession of electrical pulses, resiliently deforms the linking arm, the valve member applying a force to the abutment seat,
- a third succession of electrical pulses at a low level, lower than the mid-level of the first succession of electrical pulses, maintains the position of the valve member on the seat thereof.

Preferably, the low current level is a null value, but it may be non-null and below a typical value of 100 mA.

BRIEF DESCRIPTION OF THE DRAWINGS

This invention shall be better understood from the following description of a non-limiting example of an embodiment illustrated by the accompanying drawings wherein.

DETAILED DESCRIPTION

Figure 1:
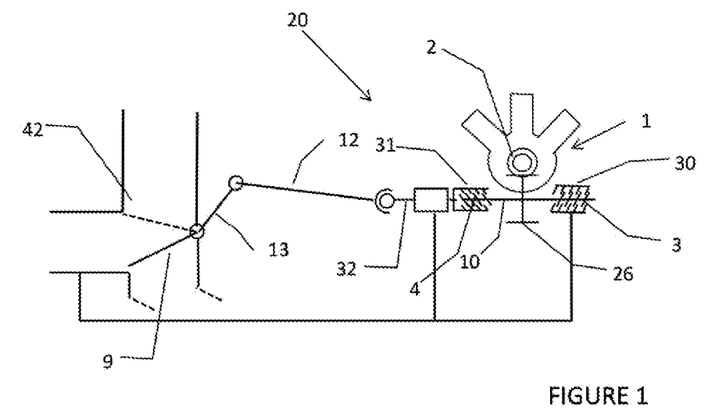
FIG. 1 is a kinematic diagram of the invention.
Figure 2:
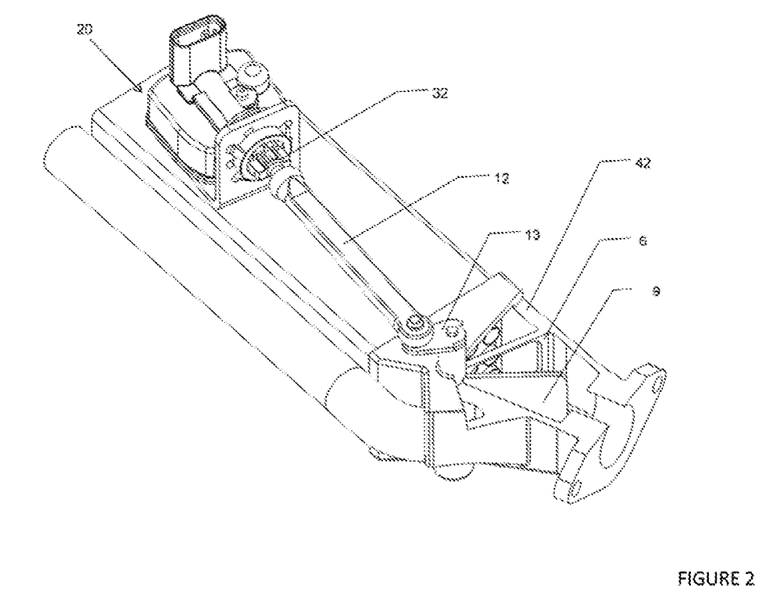
FIG. 2 is a perspective view of a EGR cooling bypass valve for using an actuator according to the invention.
Figure 7:
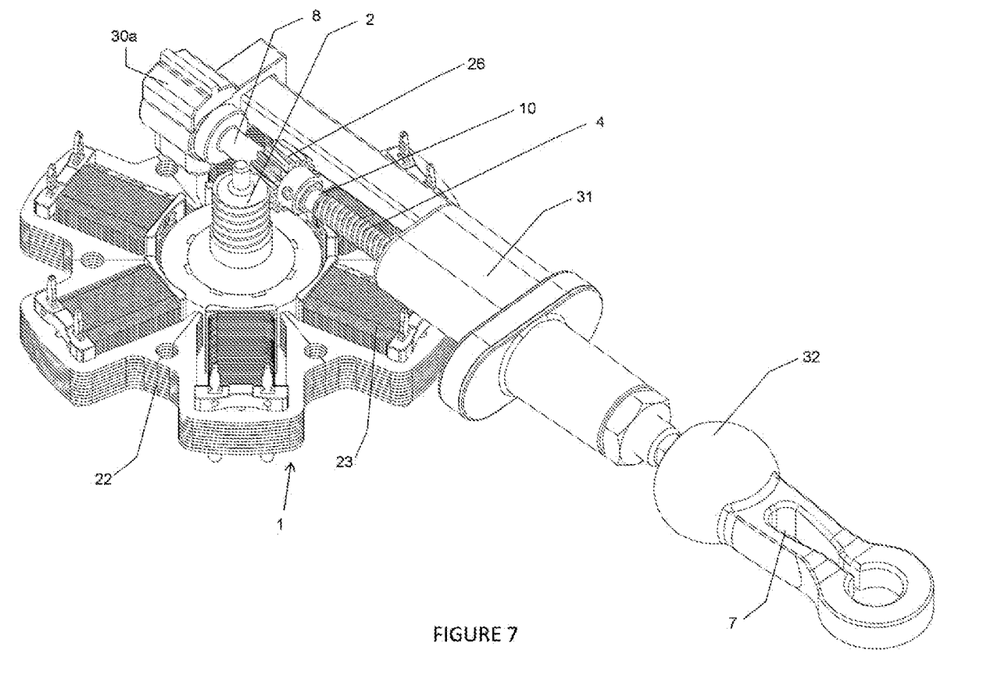
FIG. 7 shows another embodiment of an actuator according to the invention.

The solution according to the invention will be described hereinafter in an embodiment concerning, by way of example, a motorized valve for an exhaust gas recirculation exchanger, comprising an electronic control device associated with a linear actuator (20). The latter is composed of an electric motor (1) having preferably a flat-shaped stator and a rotor driving a worm gear (2), a threaded rod (10) carrying a toothed wheel (26) meshing with the worm gear (2) and extended by two threaded portions (3, 4), a fixed nut (30), a movable nut (31) extended by a control member (32), a linking arm (12) in a ball joint connection with the control member (32) and a secondary transmission lever (13) driving integrally in rotation the valve member (9) of a valve (42). The threaded rod (10) of the motion conversion device is guided only by two helical type connections with opposing helix directions using nuts (30, 31) made of plastics material. This conversion motion is obtained as that presented in more detail in the application WO2014/173667 and is not exclusive, as it may be envisaged to obtain the threaded rod (10) in the form of a simple screw associated with the worm gear (2) so as to obtain only a rotational motion of the threaded rod (10), as shown in FIG. 7. FIG. 2 shows a realistic embodiment of the motorized valve according to the invention, wherein the seat (6) of the valve on which the valve member abuts at the end of its stroke is also visible.

Figures 3A, 3B:
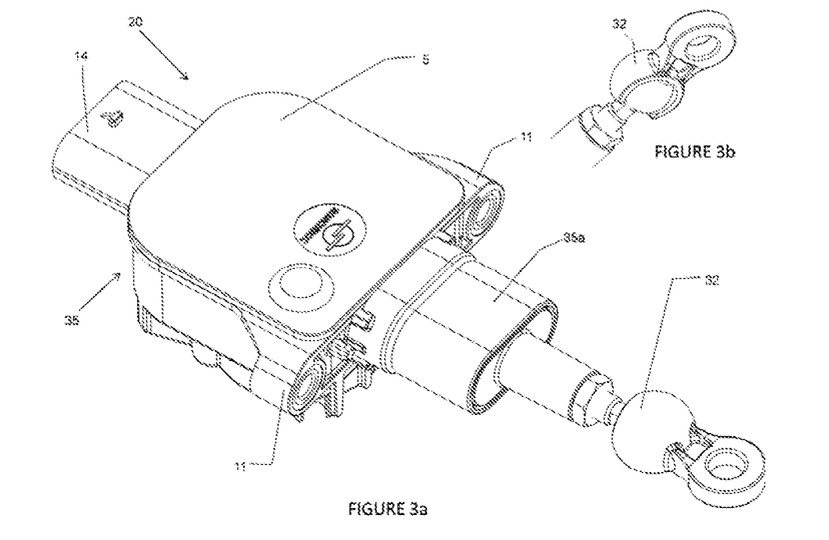
FIGS. 3a and 3b is a perspective view of an actuator according to the invention and of a control member according to an embodiment respectively.

FIG. 3a shows the actuator (20) in a preferred embodiment. The control member (32) is in the form of a ball joint, the details of which are shown in FIG. 3b. The ball joint has a hemispherical shape to make it easier to mount, but this is only one embodiment. This ball joint advantageously allows a degree of rotational freedom to be given to the coupling of the actuator (20) to the linking arm (12) which may therefore accept a dealignment of the actuator (32) with respect to the linking arm (12). The form factor of the actuator (20) is here emphasized, through the low height, transversely relative to the linear motion of the control member (32), giving said actuator (20) the shape of a flat box. Another benefit of this embodiment is also the possibility of centering the motion output relative to the fastening elements (11) of the casing (35), forming a nose (35a) equidistant from the two fastening elements (11).

Figure 4:
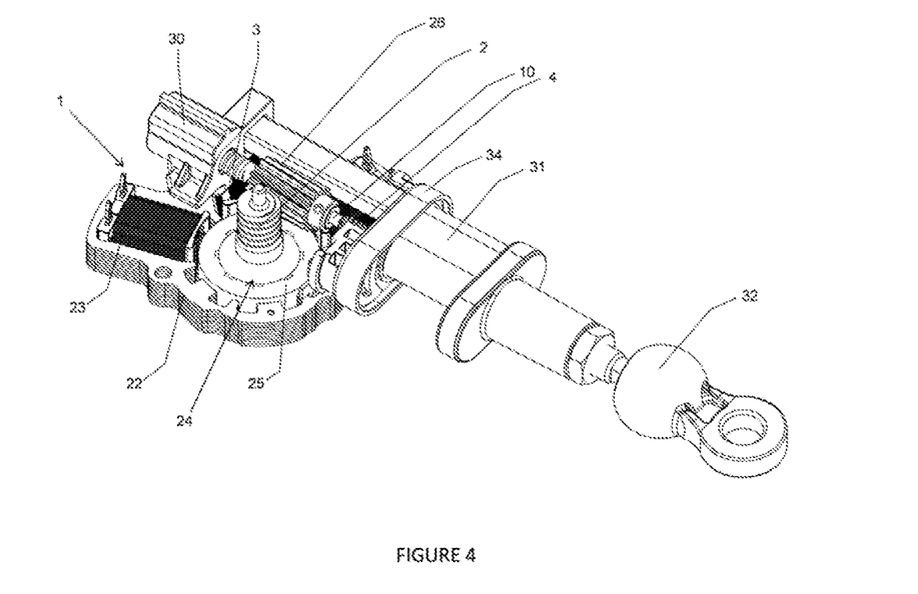
FIG. 4 is a perspective view of an embodiment of the kinematic chain of an actuator according to the invention.

FIG. 4 shows the electric motor (1) of the actuator (20), which is flat in shape. It comprises three electrical phases in the stator (22) in the form of three coils (23), and a rotor (24), which comprises a five-pole magnet (25), molded by a plastics hub, having a worm gear portion (2). This worm gear (2) drives in rotation a toothed wheel (26) rigidly connected to a threaded rod (10) having on either side of the toothing two threaded portions (3, 4), one having a right-hand thread and the other having a left-hand thread. When the rotor (24) rotates, this threaded rod (10) is screwed into a fixed nut (30) made of plastic and attached, here by welding, to the cover (5) of the actuator (20) through said actuator, which forces it to follow a helical motion. This threaded rod (10) drives a control member (32) slidably engaged with the actuator casing (35) according to a purely translational motion by means of the second helical connection with the nut (31) movable in the opposite direction. This motion conversion is particularly suitable for the application because gas pulsations act on the valve member (9) and then on the various transmission levers, and generate axial micro-movements of the threaded shaft. These micro-movements are supported by the two nuts (30) and (31), which carry the threaded rod (10) and of which the thread length and its material, advantageously made of plastics, allow the vibrations to be dampened and good endurance to be ensured, in the same way as the resilient membrane of the pneumatic cylinder of the current solution. In effect, the various elements of the kinematic chain thus created are deformable and allow the loads applied to them to be damped. In addition, the worm gear-type connection, which is placed between this threaded rod (10) and the rotor (24) of the motor (1), protects these axial micro-displacements from premature wear. This solution is a decisive advantage over the state-of-the-art solutions in which the kinematics usually include a ball bearing which is less able to withstand this type of alternating stress (pulsations) on fixed positions, since it is only present at the end positions of the valve stroke. The advantage obtained from the deformation of the kinematic chain is the possibility of obtaining a greater stroke of said kinematic chain relative to the stroke of the valve member in order to tension mechanically said valve member on the valve seat (6). By stopping the motor and the irreversible nature of the motion conversion, it will be possible to keep the valve member in the closed position by applying a stress which will prevent the opening of the valve member under load fluctuations, even when the motor is no longer powered.

The linking arm (12), in ball joint connection with the control member (32), in turn drives a secondary lever (13), said secondary lever being connected to the valve member (9) of the gas recirculation exchanger valve. This transmission by levers makes it possible, on the one hand, to create the rotary motion for the valve member (9) of the valve (42) and, on the other hand, to thermally decouple this valve, which has a temperature of several hundred degrees, from the electric actuator (20) having guide elements (30, 31) and control electronics (36) placed on the printed circuit (37), which are sensitive to high temperatures.

Figure 5:
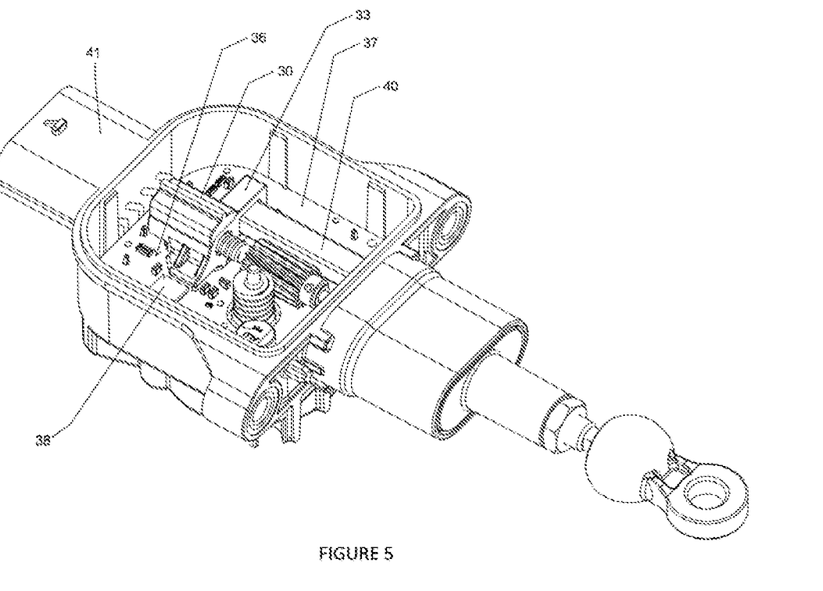
FIG. 5 is a perspective view of an actuator without cover according to an embodiment.

In a preferred but not limiting manner, the stator (22) has three coils (23) extended radially on the same side, so as to offset the rotor (24) from the outer contour of the stator and to allow the use of a worm gear in which the output wheel (26) remains centered on the contour of the stator and therefore on the contour of the actuator casing (20). The whole of the mechanism for converting rotary motion into linear motion is constructed to run parallel to the motor used and to occupy a space of similar length. The actuator also preferably comprises a gasket (34) rigidly connected to the casing (35) in which the movable nut (31) slides. Furthermore, the sealing of the casing (35) is completed by laser welding through the cover (5), thus closing the actuator on the top thereof. The connector (14) also has a gasket (not visible) to complete the sealing.

The electronic control circuit (36) is integrated parallel to the motor (1) and may, on the basis of a control signal, cause the valve member (9) of the gas recirculation valve to move to the desired position. Digital magnetosensitive elements (not visible), positioned on the electronic control circuit (36), allow the exact position of the rotor (24) to be known at all times. A microprocessor (38) is provided adapted to control the coils of the stator according to this position of the rotor in order to maintain an optimum drive torque.

Figure 6:
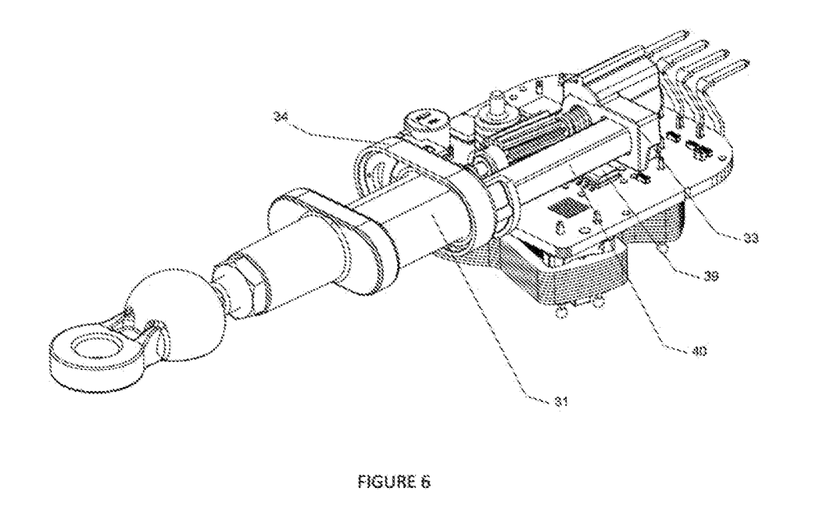
FIG. 6 is another perspective view of an embodiment of the kinematic chain of an actuator according to the invention.

This "auto-switching" control mode allows the speed and the current level to be corrected according to the load applied to the control member so that the synchronism between the rotor and the stator field is never lost. This control mode provides additional control safety in comparison to a stepper control, corresponding to an open-loop control, without position control of the rotor and therefore without step loss security. The electronic circuit (36) of the motor may also receive a second type of magnetosensitive probe (39), visible in FIG. 6, allowing the linear position of a permanent magnet (40) connected to the movable nut (31) to be detected. This position sensor provides the position of the valve member (9). It also makes it possible to manage the displacement of the valve member (9) by allowing a more substantial stroke in the described kinematic chain to put the valve member (9) under mechanical tension. The magnet (40) is advantageously encapsulated in a plastics material which then forms, together with the fixed bearing (33), a guide, which also helps to guide the movable nut (31) and therefore the threaded rod (10).

The electronic circuit (36) of the motor is designed to receive either analog or PWM control signals or messages according to a LIN protocol. Depending on the case, either the LIN or PWM communication protocol may be used to return to the vehicle computer information related to the position sensor, or an additional separate connection pin in the connector (41) may be used to provide this position signal.

FIG. 7 shows another way of making an actuator according to the invention. In this case, the stator (22) of the electric motor (1) is a three-phase flat motor having six coils arranged at 60 degrees from each other and supported by stator teeth, extending radially without a pole head, in the same way as the motor described in FIG. 4. This embodiment also illustrates the possibility of using a threaded rod (10) different from that used in the preceding embodiments. This threaded rod (10) remains driven at the level of a toothed wheel (26) by a worm gear (2), but has, on the rear part, a simple smooth rod (8) guided by a slide bearing (30a), said threaded rod (10) having in this embodiment only one degree of rotation about the axis of said rod (10). On its front part, as well as in the preceding embodiments, the threaded rod is extended by a threaded portion (4) which cooperates with a movable nut (31) which advances the control member (32). Said control member (32) has an opening (7) facilitating the insertion of the linking arm (22), not shown here. It is specified that the technological choices made for the construction of the motor (1), the worm gear motion conversion (2, 10) and the control member (32) are not limiting and may, moreover, be taken indiscriminately from either FIG. 4 or 7.

Figure 8:
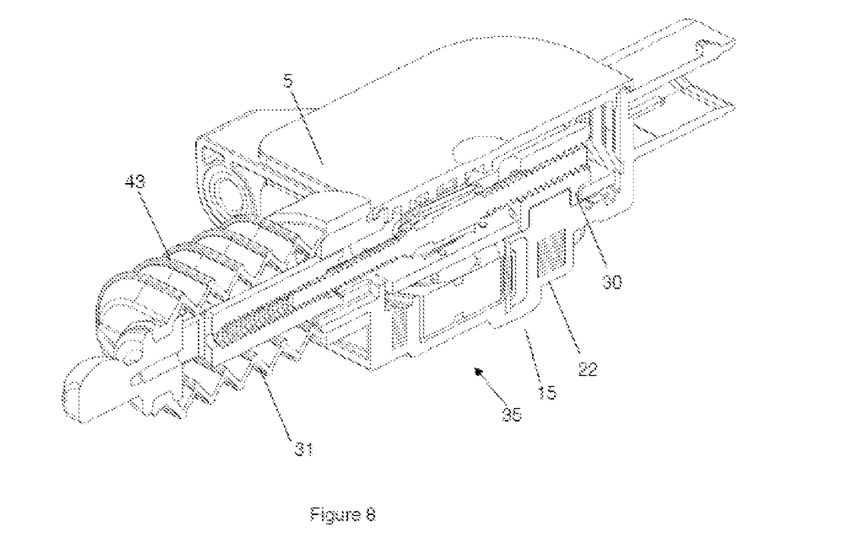
FIG. 8 shows an alternative embodiment of an actuator according to the invention.

FIG. 8 shows an alternative compact embodiment where the nut (30) is rigidly connected to the bottom (15) of the casing (35) without connection with the cover (5). In this non-preferred example, the vibration resistance of the nut (30) will however be less than the preferred case wherein the nut is rigidly connected to the casing (35) and the cover (5) as shown in FIG. 5. The stator (22) of the electric motor (1) is overmolded in the bottom (15) of the casing (35) in order to improve the mechanical strength and dissipation of the thermal energy emitted by the latter. The seal of the motor is ensured here by a bellows (43) which is on the one hand attached in a sealed manner to the free end, attached to the movable member (32) of the movable nut (31), and on the other hand to the casing (35).

Figure 9:
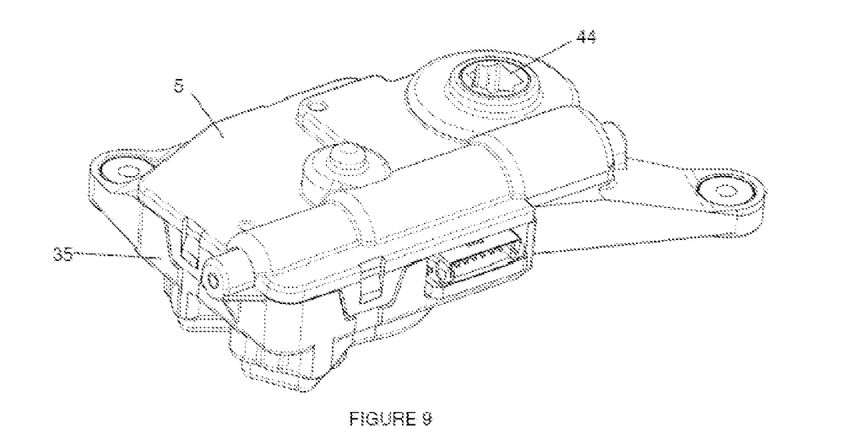
FIGS. 9, 10 and 11 show another alternative embodiment of an actuator according to the invention.
Figure 10:
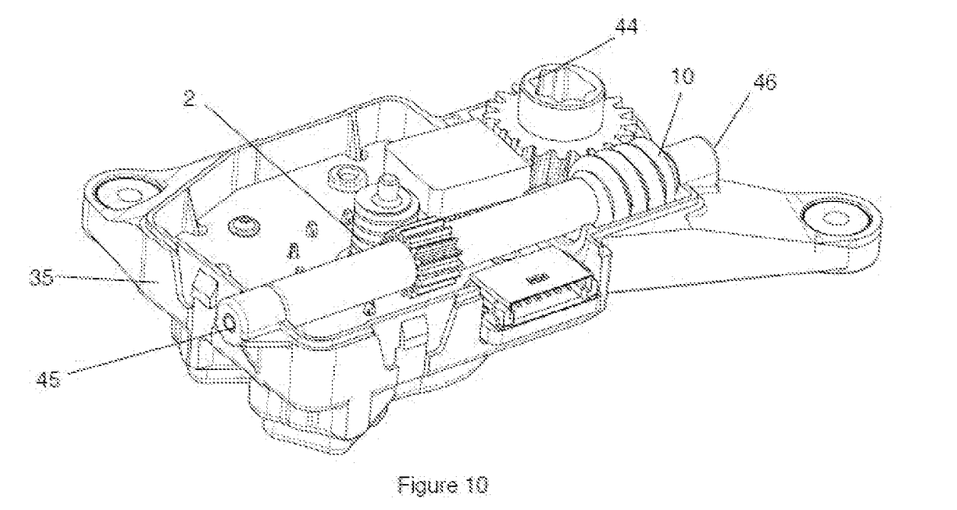
Figure 11:
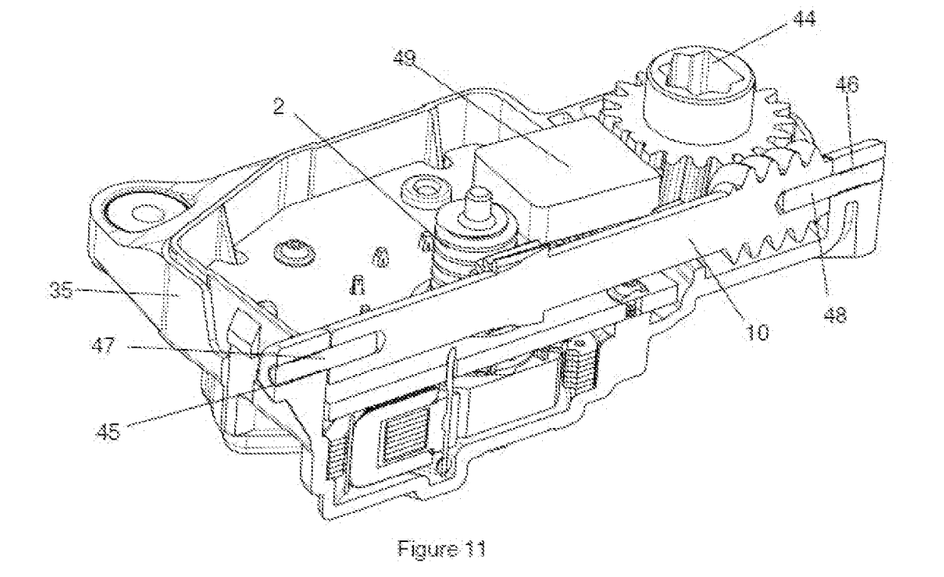

FIGS. 9, 10 and 11 show an alternative embodiment of an actuator according to the invention which has a rotary motion output through an output wheel (44). This embodiment differs in particular from the first embodiment shown above in that the threaded rod (10) drives the output wheel (44), the assembly formed by the output wheel (44) and the threaded rod (10) forming a worm gear-type motion conversion. In this way, the axis of rotation of said output wheel (44) is perpendicular to said threaded rod (10) and, preferably but not restrictively, the axis of rotation of the worm gear (2) linked to the rotor (24) and the axis of rotation of the output wheel (44) are parallel. In this embodiment, the casing (35), preferably made of injected plastics, has two bored housings (45, 46) located on either side of the threaded rod (35) forming two slide bearings receiving two shafts (47, 48) guiding the threaded rod in rotation. These shafts (47, 48) are also placed inside the threaded rod (10) in blind housings forming bearings.

The invention claimed is:

1. An electric actuator comprising:
   a casing having a bottom on which is fixed an electric motor having a stator with straight teeth extending radially and carrying a plurality of coils and a rotor formed of a plurality of magnets;
   the coils extending in a plane parallel to the bottom of the casing;
   the rotor being extended by a pinion forming a worm gear with an axis perpendicular to an orientation of the coils;
   the worm gear directly engaging a threaded rod extending parallel to the bottom of the casing;
   the threaded rod being guided at a rear by a fixed slide bearing or by a fixed nut, the slide bearing or nut being rigidly connected to the casing;
   a printed circuit to which the plurality of coils is connected being positioned between the stator and the threaded rod; and
   the threaded rod being located above and covering at least one of the straight teeth of the stator.

2. The electric actuator according to claim 1, wherein the printed circuit is positioned above the stator.

3. The electric actuator according to claim 1, wherein an axial end of the worm gear is guided by a cover of the casing.

4. The electric actuator according to claim 3, wherein the slide bearing or the nut is rigidly connected to the casing cover, and the cover closes the casing.

5. The electric actuator according to claim 1, further comprising a kinematic chain formed by at least the following elements: the electric motor driving the rotor carrying the worm gear, the threaded rod being moved rotatably by the worm gear according to a worm gear-type conversion, the conversion being irreversible, the threaded rod driving a control member in a linear motion according to a conversion from a rotary motion to a linear motion, a control member driving a linking arm, the linking arm driving at one end a valve member, the valve member moving towards an end-of-stroke position in abutment on a seat,
   wherein:
   (a) at least one of the elements forming the kinematic chain is made of a plastics material which is resiliently deformable in compression or bending, and
   (b) a stroke of the kinematic chain is greater than a stroke of the valve member so that the valve member applies a force to the seat in the end-of-stroke position, even in the absence of power to the electric motor.

6. The electric actuator according to claim 5, wherein the linking arm or the control member includes a ball joint in order to have at least one degree of freedom with respect to the control member or the linking arm respectively.

7. The electric actuator according to claim 1, wherein the threaded rod cooperates on the one hand with the fixed nut and on the other hand with a movable nut forming a control member, and the threaded rod is moved in a helical motion.

8. The electric actuator according to claim 7, wherein the fixed nut is welded to the cover of the actuator.

9. The electric actuator according to claim 7, wherein the control member is rigidly connected to a permanent magnet extending parallel to the threaded rod and a magnetosensitive probe, fixed relative to the permanent magnet, is positioned on the printed circuit in the actuator in order to determine a linear position of the control member.

10. The electric actuator according to claim 9, wherein the permanent magnet is encapsulated in a plastics material and is guided in translation by a fixed bearing.

11. The electric actuator according to claim 10, wherein the bearing is rigidly connected to the fixed nut.

12. The electric actuator according to claim 7, wherein the movable nut is guided by the casing of the actuator.

13. A method for controlling an electric actuator comprising a kinematic chain formed by at least the following elements:
    an electric motor driving a rotor carrying a worm gear, a threaded rod, a control member and a linking arm, the threaded rod being moved in a rotary motion by the worm gear according to a worm gear-type conversion, the conversion being irreversible, the threaded rod driving the control member in a linear motion according to a conversion from a rotary motion to a linear motion, the control member driving the linking arm, the linking arm driving at one end a valve member, the valve member moving towards an end-of-stroke position, abutting on a seat; making at least one of the elements of the kinematic chain of a plastics material which is resiliently deformable in compression or bending;
    causing a stroke of the kinematic chain to be greater than a stroke of the valve member so that the valve member applies a force on the seat in the end-of-stroke position, even in the absence of power to the electric motor; and
    controlling the actuator according to a succession of electrical pulses, wherein:
    (a) a first succession of the electrical pulses following a mid-level of electrical current brings the valve member from a position called "open" to a position called "closed" wherein the valve member is in abutment on the seat at the end of stroke,
    (b) a second succession of the electrical pulses following a high level, higher than the mid-level of the first succession of the electrical pulses, resiliently deforms the linking arm, the valve member applying a force to the abutment seat, and
    (c) a third succession of the electrical pulses following a low level, lower than the mid-level of the first succession of the electrical pulses, maintains the position of the valve member on the seat.

14. The method for controlling the electric actuator according to claim 13, wherein the low level is a null value.

15. The method for controlling the electric actuator according to claim 13, wherein the low level is a value below 100 mA.

* * * * *